United States Patent
Mu

(10) Patent No.: US 12,556,347 B2
(45) Date of Patent: Feb. 17, 2026

(54) FREQUENCY SWITCHING METHOD

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 423 days.

(21) Appl. No.: 18/015,890

(22) PCT Filed: Aug. 13, 2020

(86) PCT No.: PCT/CN2020/109019
§ 371 (c)(1),
(2) Date: Jan. 12, 2023

(87) PCT Pub. No.: WO2022/032595
PCT Pub. Date: Feb. 17, 2022

(65) Prior Publication Data
US 2023/0246794 A1    Aug. 3, 2023

(51) Int. Cl.
*H04L 5/00* (2006.01)
(52) U.S. Cl.
CPC .......... *H04L 5/0096* (2013.01); *H04L 5/0064* (2013.01); *H04L 5/0007* (2013.01)
(58) Field of Classification Search
None
See application file for complete search history.

(56) References Cited

U.S. PATENT DOCUMENTS

| | | | | |
|---|---|---|---|---|
| 2019/0028143 | A1* | 1/2019 | Zhang | H04L 5/0044 |
| 2021/0392614 | A1* | 12/2021 | Sakhnini | H04W 72/0453 |
| 2022/0346094 | A1* | 10/2022 | Yan | H04B 1/713 |
| 2023/0328721 | A1* | 10/2023 | Ohara | H04L 5/0094 |

FOREIGN PATENT DOCUMENTS

| | | |
|---|---|---|
| CN | 106797305 A | 5/2017 |
| CN | 108353056 A | 7/2018 |
| CN | 109076323 A | 12/2018 |

OTHER PUBLICATIONS

PCT/CN2020/109019 English translation of International Search Report dated May 17, 2021, 2 pages.
Nokia Networks "Retuning Gaps for MTC," 3GPP TSG-RAN WG1 Meeting #82bis, R1-155132, Oct. 2015, 6 pages.

\* cited by examiner

*Primary Examiner* — Shukri Taha
(74) *Attorney, Agent, or Firm* — Cozen O'Connor

(57) ABSTRACT

A frequency switching method is provided. The method includes determining a set of positions for frequency switching, according to configuration parameters related to frequency switching of a terminal and frequency switching points. The configuration parameters may include a number of resource units occupied by the terminal for the frequency switching, or a number of orthogonal frequency division multiplexing (OFDM) symbols occupied for the frequency switching. A frequency switching apparatus is also provided.

20 Claims, 4 Drawing Sheets

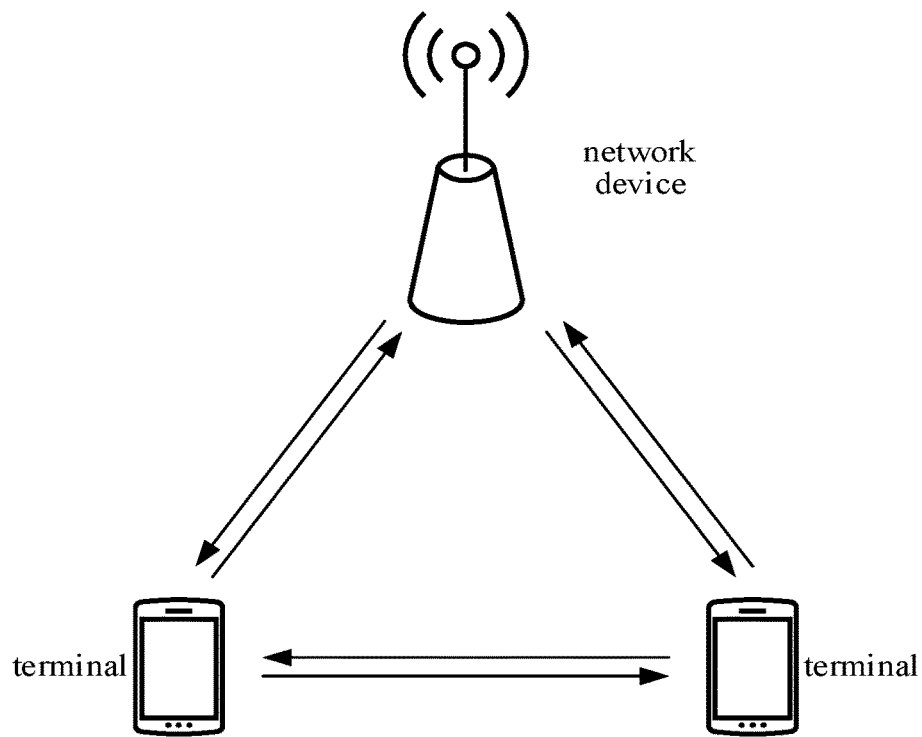
FIG. 1
determining a set of positions for frequency switching, according to configuration parameters related to frequency switching of a terminal and frequency switching points — S11
FIG. 2
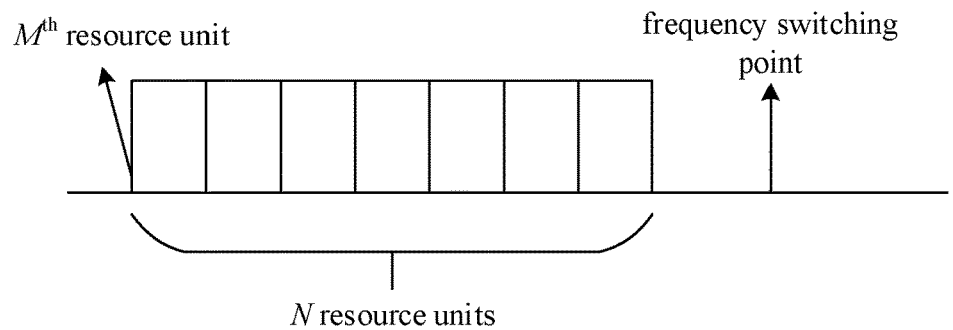
FIG. 3

FREQUENCY SWITCHING METHOD

CROSS-REFERENCE TO RELATED APPLICATION

This application is the U.S. national phase application of International Patent Application No. PCT/CN2020/109019, filed on Aug. 13, 2020, the entire contents of which are incorporated herein by reference.

FIELD

The present disclosure relates to the field of wireless communication, and in particular, to a frequency switching method, a frequency switching apparatus, and a storage medium.

BACKGROUND

In a communication system, machine type communication (MTC) and narrow band Internet of Things (NB-IoT) technologies are proposed for low-rate and high-delay scenarios of Internet of Things services.

In related technologies, the development of new and different applications for IoT terminals has led to the situation where MTC and NB-IoT technologies can no longer meet rate and delay requirements of current Internet of Things services. Therefore, a new terminal known as a reduced capability UE (or abbreviated as a NR-lite) is designed to cover the requirements of the Internet of Things services. At present, to solve the problem of limited terminal capability, coverage enhancement is adopted, and frequency hopping transmission is further introduced. In the process of frequency hopping, the terminal needs to switch frequencies, and the terminal cannot send or receive signals normally while it is in the process of the frequency switching.

SUMMARY

To overcome the problems existing in the related art, the present disclosure provides a frequency switching method, a frequency switching apparatus, and a storage medium.

The frequency switching method provided by the present disclosure may be applied to a terminal, a network side device (such as a base station, a core network, etc.), a protocol definition, etc.

According to a first aspect of the embodiments of the present disclosure, there is provided a frequency switching method. The method includes determining a set of positions for frequency switching, according to configuration parameters related to frequency switching of a terminal and frequency switching points.

According to a second aspect of the embodiments of the present disclosure, there is provided a frequency switching apparatus, including a processor; and a memory for storing instructions executable by the processor; in which the processor is configured to implement the frequency switching method described in the first aspect, or any of the embodiments in the first aspect.

According to a third aspect of the embodiments of the present disclosure, there is provided a non-transitory computer-readable storage medium having stored therein instructions that, when executed by a processor of a mobile terminal, cause the mobile terminal to perform the frequency switching method described in the first aspect, or any of the embodiments in the first aspect.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 1 is a schematic diagram showing a communication system between a network device and a terminal according to an illustrative embodiment.

FIG. 2 is a flow chart showing a frequency switching method according to an illustrative embodiment.

FIG. 3 is a schematic diagram showing M resource units before a frequency switching point as a set of positions of a terminal for frequency switching according to an illustrative embodiment.

DETAILED DESCRIPTION

Figure 4:
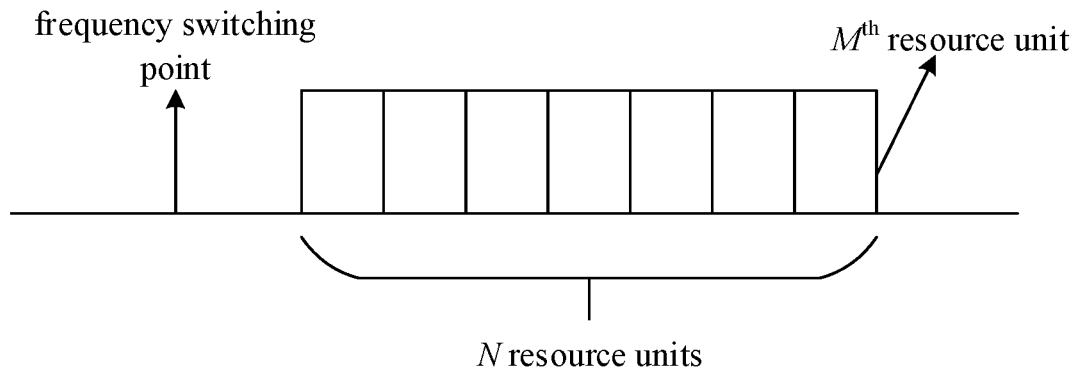
FIG. 4 is a schematic diagram showing M resource units after a frequency switching point as a set of positions of a terminal for frequency switching according to an illustrative embodiment.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to some aspects of the present disclosure as recited in the appended claims.

In a communication system, two technologies, MTC and NB-IoT, are proposed for low-rate and high-delay scenarios (such as meter reading and environmental monitoring scenarios) in Internet of Things services. At present, the NB-IoT technology may support a maximum rate of several hundred kilobytes, and the MTC technology may support a maximum rate of several megabytes. However, with the ongoing development of Internet of Things services (such as monitoring, smart home, wearable devices, and industrial sensor detection), a rate of several tens to one hundred M is generally required, and requirements for delay are relatively increased. Therefore, in the communication system, two major technologies of MTC and NB-IoT may no longer meet the requirements of the current Internet of Things services. Therefore, it is proposed to design a new user equipment in a new radio of the communication system to cover service requirements of a mid-end IoT device which requires a rate of several tens to one hundred M, and has a relatively high delay at the same time. At present, in the standardization of 3rd generation partnership project (3GPP), a user equipment used to cover the service requirements of the mid-end IoT device with the rate of several tens to one hundred M and the high delay is referred to as a reduced capability UE (abbreviated as a Redcap terminal or a NR-lite).

On the other hand, the NR-lite generally needs to meet requirements of low cost, low complexity, a certain degree of coverage enhancement, and power saving. However, a new radio communication technology is designed for a high-end terminal with a high speed and a low delay, which cannot meet the above requirements of the NR-lite. Therefore, it is necessary to transform the current new radio communication technology to meet the above requirements of the NR-lite. For example, a radio frequency (RF) bandwidth of an Internet of Things may be limited (for example, limited to 5 MHz or 10 MHz, or a buffer size of the NR-lite is limited) according to the requirements of low cost and low complexity, thus limiting the size of each received transport block, etc. For another example, a communication flow may be simplified according to the requirement of power saving to reduce the number of times a NR-lite user detects a downlink control channel, and the like.

However, a coverage capability of the Redcap terminal will be limited due to the limitation of a capability of the Redcap terminal. In the related art, coverage enhancement measures are adopted, such as repeated transmission (in which the repeated transmission refers to transmitting a same content in a time domain), and frequency hopping transmission is further introduced on the basis of the repeated transmission. The terminal needs to switch RF in the process of the frequency hopping based on the limitation of a capability of the Redcap terminal. However, in the process of switching RF by the terminal, frequency switching will lead to blank time for sending or receiving, which generally causes the terminal to fail to send or receive signals, thus resulting in signal loss. Therefore, the present disclosure provides a frequency switching method, which may determine the blank time for sending or receiving caused by the frequency switching, so as to avoid losses caused when the terminal sends or receives signals in the blank time.

FIG. 1 is a schematic diagram showing a communication system between a network device and a terminal according to an illustrative embodiment. A frequency switching method provided by the present disclosure may be applied to a communication system shown in FIG. 1. As shown in FIG. 1, a terminal sends a transmission content to a network device, or a terminal receives a transmission content sent by a network device.

It may be understood that the communication system between the network device and the terminal shown in FIG. 1 is only for schematic illustration. The wireless communication system may also include other network devices, such as core network devices, wireless relay devices, and wireless backhaul devices, which are not shown in FIG. 1. The number of network devices and the number of terminals included in the wireless communication system are not limited in embodiments of the present disclosure.

It may be further understood that the wireless communication system in the embodiment of the present disclosure is a network that provides a wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier frequency division multiple access (SC-FDMA), and carrier sense multiple access with collision avoidance. The network may be divided into a 2nd generation (2G) network, a 3G network, a 4G network, or a future evolution network, such as a 5G network, which may also be referred to as a new radio (NR) network, according to the capacity, rate, delay and other factors of different networks. For ease of description, a wireless communication network will be sometimes abbreviated as a network in the present disclosure.

Further, the network device involved in the present disclosure may also be referred to as a radio access network device. The radio access network device may be a base station, an evolved node B, a home base station, an access point (AP) in a wireless fidelity (WIFI) system, a wireless relay node, a wireless backhaul node, a transmission point (TP), a transmission and reception point (TRP), or the like, or may also be a gNB in a NR system, or may also be a component or a part of a device that constitutes a base station, etc. The network device may also be a vehicle-mounted device when it is used in a vehicle to everything (V2X) communication system. It is to be understood that the specific technology and specific device form adopted by the network device are not limited in the embodiments of the present disclosure.

Further, the terminal involved in the present disclosure, which may also be referred to as a terminal device, a user equipment (UE), a mobile station (MS), a mobile terminal (MT), etc., is a device that provides voice and/or data connectivity to a user. For example, the terminal may be a handheld device with a wireless connection function, a vehicle-mounted device, or the like. At present, some examples of the terminal are a smart phone, a pocket personal computer (PPC), a palmtop computer, a personal digital assistant (PDA), a notebook computer, a tablet computer, a wearable device, a vehicle-mounted device, or the like. In addition, the terminal device may also be vehicle-mounted device when it is used in a vehicle to everything (V2X) communication system. It is to be understood that the specific technology and specific device form adopted by the terminal are not limited in the embodiments of the present disclosure.

The frequency switching method provided by the present disclosure may be applied to a terminal, a network side device (such as a base station, a core network, etc.), a protocol definition, etc.

FIG. 2 is a flow chart showing a frequency switching method according to an illustrative embodiment. As shown in FIG. 2, the method includes step S11.

In step S11, a set of positions for frequency switching is determined, according to configuration parameters related to frequency switching of a terminal and frequency switching points.

In an embodiment of the present disclosure, the configuration parameters related to frequency switching of the terminal (for example, receiving/sending time of the terminal during the frequency hopping transmission) are determined. All possible candidate positions of the terminal for the frequency switching are determined, according to the configuration parameters related to frequency switching of the terminal and frequency switching points, in which all possible candidate positions may be one or more positions. Further, the set of positions of the terminal for the frequency switching is determined, and a position of the terminal for the frequency switching is selected from the set of positions of the terminal for the frequency switching to perform frequency switching.

The configuration parameters related to frequency switching of the terminal, i.e., the receiving/sending time of the terminal during the frequency switching, are N resource units that the terminal needs to occupy for the frequency switching. It may be understood that the N resource units occupied by the terminal for the frequency switching are resource units in which data transmission cannot be performed when the terminal performs the frequency switching.

In an embodiment of the present disclosure, the N resource units occupied by the terminal for the frequency switching have different values of N under different subcarrier interval settings.

The N resource units included in the set of positions where the frequency switching is determined may be determined to be at a same position. For example, the N resource units included in the set of positions for the frequency switching may be set to N resource units before the frequency switching point. Alternatively, the N resource units included in the set of positions for the frequency switching may be set to N resource units after the frequency switching point. Alternatively, the N resource units included in the set of positions for the frequency switching may also be set to a total of N resource units on two sides of the frequency switching point.

In some embodiments of the present disclosure, the position of the terminal for the frequency switching selected from the set of positions of the terminal for the frequency switching may be M resource units before the frequency switching point as the set of positions for the frequency switching, where M is greater than or equal to N. FIG. 3 is a schematic diagram showing M resource units before a frequency switching point as a set of positions for frequency switching of a terminal according to an illustrative embodiment. Illustratively, if a value of N is 7, as shown in FIG. 3, 7 resource units of the M resource units before the frequency switching point are determined as the set of positions of the terminal for the frequency switching.

In some embodiments of the present disclosure, N resource units before a boundary of the frequency switching point may also be selected as the set of positions of the terminal for the frequency switching, that is, M is equal to N.

In some embodiments of the present disclosure, the set of resource units occupied for the frequency switching is a number of orthogonal frequency division multiplexing (OFDM) symbols occupied for the frequency switching. The configuration parameters related to frequency switching of the terminal are transmission contents corresponding to at least two resource units. The OFDM is taken as an example for description in the present disclosure, but the resource is not limited to the OFDM, but may be other types of resources.

In some embodiments of the present disclosure, the position of the terminal for the frequency switching selected from the set of positions of the terminal for the frequency switching may be M resource units after the frequency switching point as the set of positions for the frequency switching, where M is greater than or equal to N. FIG. 4 is a schematic diagram showing M resource units after a frequency switching point as a set of positions of a terminal for frequency switching according to an illustrative embodiment. Illustratively, if a value of N is 7, as shown in FIG. 4, 7 resource units of the M resource units after the frequency switching point are determined as the set of positions of the terminal for the frequency switching.

In some embodiments of the present disclosure, N resource units after a boundary of the frequency switching point may also be selected as the set of positions of the terminal for the frequency switching, that is, M is equal to N. The N resource units occupied for the frequency switching is a number of orthogonal frequency division multiplexing (OFDM) symbols occupied for the frequency switching. Configuration parameters related to frequency switching of a first type UE are transmission contents corresponding to at least two resource units.

In some embodiments of the present disclosure, the position of the terminal for the frequency switching selected from the set of positions of the terminal for the frequency switching may be the resource units on two sides of the frequency switching point as the set of positions for the frequency switching, in which X resource units before the frequency switching point and Y resource units after the frequency switching point may be determined as the set of positions for the frequency switching, where X and Y are both greater than or equal to 0, and a sum of X and Y is greater than or equal to N.

Figure 5:
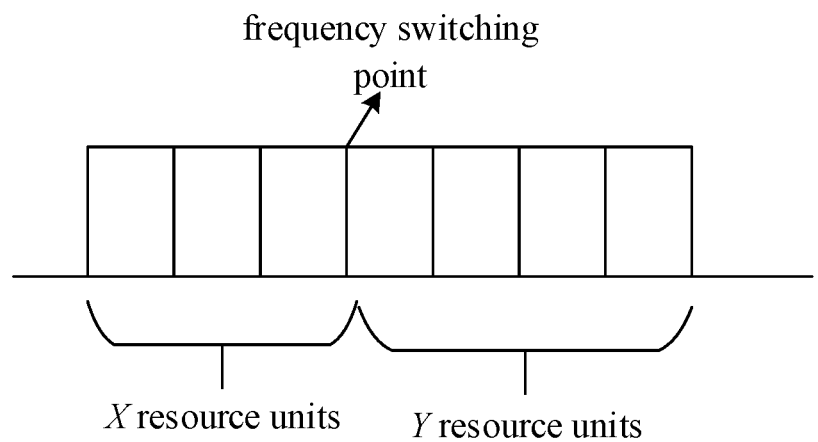
FIG. 5 is a schematic diagram showing a set of positions of a terminal for frequency switching on two sides of a frequency switching point according to an illustrative embodiment.

FIG. 5 is a schematic diagram showing a set of positions of a terminal for frequency switching on two sides of a frequency switching point according to an illustrative embodiment. Illustratively, if a value of N is 7, as shown in FIG. 5, a total of 7 resource units on two sides of the frequency switching point are determined as the set of positions of the terminal for the frequency switching.

In some embodiments of the present disclosure, if N is an even number, the N resource units determined to be equally divided on two sides of the frequency switching point may also be selected and determined as the set of positions of the terminal for frequency switching, that is, X equals to Y. The N resource units occupied for the frequency switching are the number of OFDM symbols occupied for the frequency switching. The configuration parameters related to frequency switching of the terminal are transmission contents corresponding to the at least two resource units.

In some embodiments of the present disclosure, a position offset by n resource units before the frequency switching point may be selected as a first resource position occupied by the terminal for the frequency switching in the set of positions of the terminal for the frequency switching, and the subsequent N resource units may be selected as the resource positions occupied by the terminal for the frequency switching.

Figure 6:
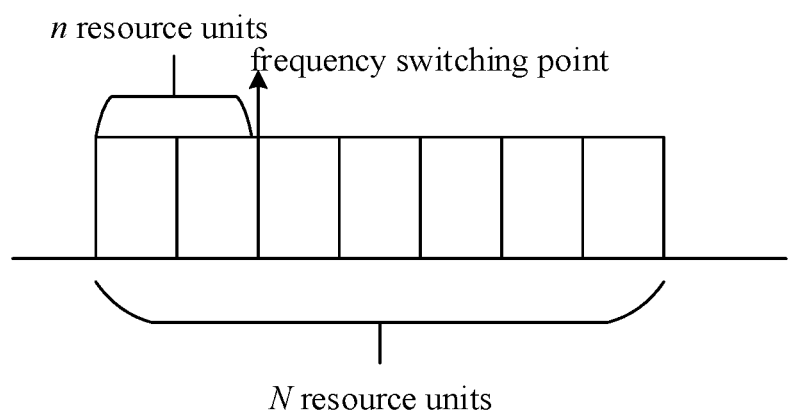
FIG. 6 is a schematic diagram showing a set of positions of a terminal for frequency switching starting from a position offset by n resource units before a frequency switching point according to an illustrative embodiment.

FIG. 6 is a schematic diagram showing a set of positions of a terminal for frequency switching starting from a position offset by n resource units before a frequency switching point according to an illustrative embodiment. Illustratively, if n is 2, and a value of N is 7, as shown in FIG. 6, it is determined that 2 resource units before the frequency switching point and 5 resource units after the frequency switching point are determined as the set of positions of the terminal for the frequency switching. The resource unit occupied for the frequency switching is the number of OFDM symbols occupied for the frequency switching.

Figure 7:
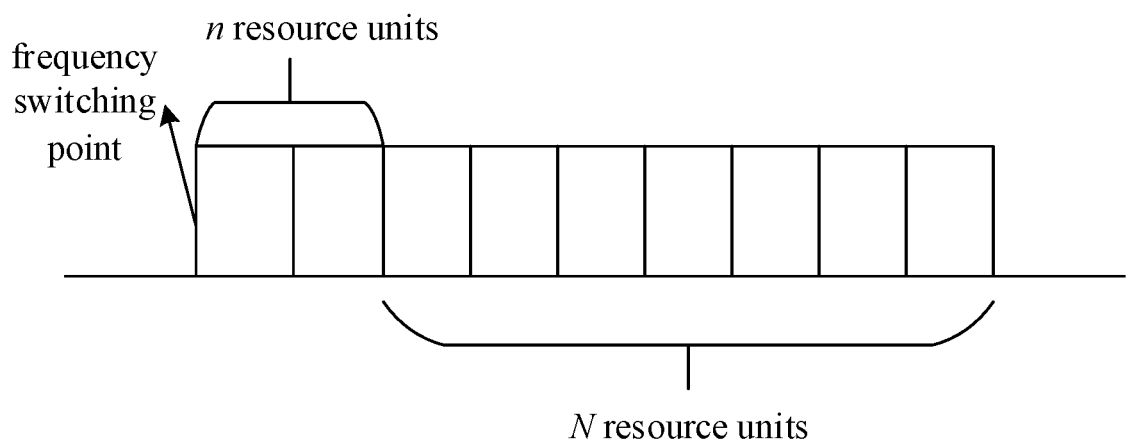
FIG. 7 is a schematic diagram showing a set of positions of a terminal for frequency switching starting from a position offset by n resource units after a frequency switching point according to an illustrative embodiment.

In some embodiments of the present disclosure, a position offset by n resource units after the frequency switching point may be selected as a first resource position occupied by the first terminal for the frequency switching in the set of positions of the terminal for the frequency switching, and the subsequent N resource units may be selected as the resource positions occupied by the terminal for the frequency switching. FIG. 7 is a schematic diagram showing a set of positions of a terminal for frequency switching starting from a position offset by n resource units after a frequency switching point according to an illustrative embodiment. Illustratively, if n is 2, and a value of N is 7, as shown in FIG. 7, it is determined that last 7 resource units offset by 2 resource units from the frequency switching point are determined as the set of positions of the terminal for the frequency switching. The resource units occupied for the frequency switching are the number of OFDM symbols occupied for the frequency switching.

In some embodiments of the present disclosure, resource positions corresponding to two unit resources before a resource position for the frequency switching are selected as a final set of positions of the terminal for frequency switching after determining the resource position for frequency switching. Alternatively, resource positions corresponding to two unit resources after the resource position for the frequency switching are selected as a final set of positions of the terminal for frequency switching. The resource unit occupied for the frequency switching is the number of OFDM symbols occupied for the frequency switching.

In some embodiments of the present disclosure, the set of positions may also be determined according to transmission channels corresponding to the at least two resource units included on two sides of the frequency switching point. Then, the terminal may determine the set of positions of the terminal for the frequency switching according to a priority of the resource positions occupied for the frequency switching. A resource position of a content with a low priority is preferentially occupied as the set of positions of the terminal for frequency switching. Determining the set of positions of the terminal for the frequency switching according to the priority of the resource position of the content includes the following various implementations, and one of them may be adaptively selected to perform frequency switching.

In an implementation, if channels for transmitting contents in two symbols are different, a priority of resource positions of contents in a downlink physical channel is that a transmission channel with a blank content has a lowest priority, then a priority of a physical downlink shared channel (PDSCH) is higher than the priority of the transmission channel with the blank content, and a priority of a physical downlink control channel (PDCCH) is highest. Therefore, the resource position of the transmission channel with the blank content preferentially occupied by the terminal is a set of positions for frequency switching, the resource position of the physical downlink shared channel secondarily occupied by the terminal is a set of positions for frequency switching, and the resource position of the physical downlink control channel finally occupied by the terminal is a set of positions for frequency switching.

The priority of the resource positions of the contents in an uplink physical channel is that a physical uplink shared channel (PUSCH) has a lowest priority, then a priority of a sounding reference signal (SRS) is higher than the priority of the physical uplink shared channel, and a priority of a physical uplink control channel (PUCCH) is highest. Therefore, the resource position of the physical uplink shared channel preferentially occupied by the terminal is a set of positions for frequency switching, the resource position of the sounding reference signal secondarily occupied by the terminal is a set of positions for frequency switching, and the resource position of the physical uplink control channel finally occupied by the terminal is a set of positions for frequency switching.

In some embodiments of the present disclosure, if the transmission channels corresponding to the at least two resource positions are the same, the resource positions on two sides of the position where the frequency switching point is located are taken as N resource units occupied by the terminal for frequency switching. For example, the N resource units occupied by the terminal for frequency switching may be equally divided on two sides of the position where the frequency switching point is located, so that the N resource units occupied by the terminal for frequency switching are evenly distributed on two sides of the frequency switching point. If the N resource units occupied for the frequency switching cannot be equally divided, the resource units occupied for the frequency switching that cannot be equally divided will preferentially occupy the resource positions before the frequency switching point, or the resource units occupied for the frequency switching that cannot be equally divided will preferentially occupy the resource positions after the frequency switching point. If the transmission channel corresponding to the resource position is the PDSCH, the N resource units occupied for frequency switching may be equally divided at the position where the frequency switching point is located according to this implementation.

If only one resource unit in at least two resource positions has different channels, the channel with a relatively high priority corresponding to the resource unit with different channels is selected for priority comparison. Illustratively, for example, if resource position 1 of the at least two resource positions include two channels, PDCCH and PDSCH, and resource position 2 includes one channel, PDSCH, the priority of PDCCH with a relatively high priority in the resource position 1 is selected for comparison with the priority of PDSCH in the resource position 2. According to the above embodiment, the priority of PDCCH is higher than the priority of PDSCH, so the resource position 2 is selected for the frequency switching.

In some embodiments of the present disclosure, if the transmission channels corresponding to the at least two resource positions are the same, the N resource units occupied by the terminal for the frequency switching may be concentrated, and N resource units on one side of the frequency switching point are occupied. Alternatively, the N resource units occupied by the terminal for the frequency switching are placed in the N resource units before the frequency switching point, or the N resource units occupied by the terminal for the frequency switching are placed in the N resource units after the frequency switching point. If the transmission channels corresponding to the at least two resource positions are PDCCHs, the N resource units occupied by the terminal for the frequency switching may be placed on one side of the frequency switching point according to this implementation.

In the case that the subcarrier interval is relatively large, the implementation of fixing the N resource units occupied by the terminal for the frequency switching in the same position in the above embodiment may be preferentially selected. In the case that the subcarrier interval is relatively large, the implementation of determining the position of the terminal for the frequency switching according to the priority of the resource position occupied by the terminal for the frequency switching in the above embodiment may be preferentially selected.

In an embodiment of the present disclosure, if part of transmission resources occupied by one channel is occupied by the terminal for the frequency switching, the transmission resources at the occupied resource position may be handled in at least one of the following operations.

In some embodiments of the present disclosure, for the resource positions occupied by the terminal for the frequency switching, a transmission content of a corresponding resource unit at the resource position occupied by the terminal for the frequency switching may be discarded in response to part of transmission resource positions occupied by one channel being occupied by the terminal for the frequency switching.

In some embodiments of the present disclosure, for the resource positions occupied by the terminal for the frequency switching, a resource unit corresponding to a resource position occupied by the terminal for the frequency switching may also be determined as an unavailable transmission resource in response to part of transmission resource positions occupied by one channel being occupied by the terminal for the frequency switching. If the resource unit corresponding to the resource position occupied by the terminal for the frequency switching is determined to be the unavailable transmission resource, the resource position occupied by the terminal for the frequency switching will be ignored when performing rate matching. In other words, the resource position occupied by the terminal for the frequency switching will not be counted when performing rate matching.

The above-mentioned two processing methods for the transmission resources at the resource positions occupied by the terminal for the frequency switching may be preferentially applied to the channel PDSCH when part of the transmission resources occupied by one channel is occupied by the terminal for the frequency switching.

In some embodiments of the present disclosure, for the resource positions occupied by the terminal for the frequency switching, a whole channel transmission corresponding to a resource position occupied by the terminal for the frequency switching may be abandoned in response to part of transmission resource positions occupied by one channel being occupied by the terminal for the frequency switching. Moreover, a network side device or a terminal may transmit subsequent resources on the whole channel after abandoning the whole channel transmission corresponding to the resource position occupied by the terminal for the frequency switching.

The above-mentioned processing method for the transmission resources at the resource positions occupied by the terminal for the frequency switching may be preferentially applied to the channel PDCCH when part of the transmission resources occupied by one channel is occupied by the terminal for the frequency switching.

Based on the same concept, embodiments of the present disclosure also provide a frequency switching apparatus.

It may be understood that, the frequency switching apparatus provided by the embodiments of the present disclosure includes corresponding hardware structures and/or software modules for performing various functions in order to implement the above-mentioned functions. The embodiments of the present disclosure may be implemented in a form of hardware or a combination of hardware and computer software in combination with units and algorithm steps of each example disclosed in the embodiments of the present disclosure. Whether a function is performed by hardware or by hardware driven by computer software depends on specific applications and design constraints of the technical solution. Those skilled in the art may use different methods to implement the described functions for each specific application, but such an implementation should not be regarded as extending beyond the scope of the technical solutions of the embodiments of the present disclosure.

Figure 8:
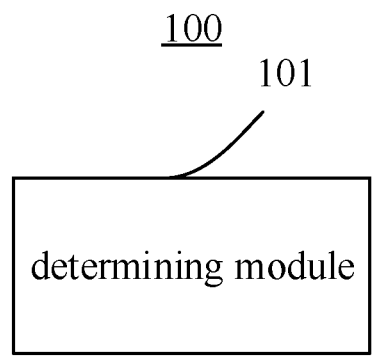
FIG. 8 is a block diagram showing a frequency switching apparatus according to an illustrative embodiment.

FIG. 8 is a block diagram showing a frequency switching apparatus 100 according to an illustrative embodiment. Referring to FIG. 8, the apparatus includes a determining module 101.

The determining module 101 is configured to determine a set of positions for frequency switching, according to configuration parameters related to frequency switching of a terminal and frequency switching points.

In an embodiment of the present disclosure, the configuration parameters related to frequency switching of the terminal include N resource units occupied by the terminal for the frequency switching.

In an embodiment of the present disclosure, the N resource units correspond to different values in different subcarrier intervals.

In an embodiment of the present disclosure, the determining module 101 is configured to determine M resource units before or after the frequency switching point as the set of positions for the frequency switching, where M is greater than or equal to N; or, determine X resource units before the frequency switching point and Y resource units after the frequency switching point as the set of positions for the frequency switching, where X and Y are both greater than or equal to 0, and a sum of X and Y is greater than or equal to N.

In an embodiment of the present disclosure, the frequency switching point is located at a center of the N resource units occupied for the frequency switching; or, the frequency switching point is located at a boundary position of the N resource units occupied for the frequency switching.

In an embodiment of the present disclosure, the configuration parameters related to frequency switching of the terminal include a number of orthogonal frequency division multiplexing (OFDM) symbols occupied for the frequency switching.

In an implementation, the apparatus includes determining resource positions of N resource units having an offset value of n with respect to the frequency switching point as the set of positions for the frequency switching, wherein N is a positive integer and N≥2, n is a positive integer and n≥0.

In an implementation, the configuration parameters related to frequency switching of the terminal include transmission contents corresponding to at least two resource units on two sides of the frequency switching point.

In an embodiment of the present disclosure, the determining module 101 is configured to determine the set of positions according to transmission channels corresponding to the at least two resource units.

In an embodiment of the present disclosure, the determining module 101 is configured to determine the set of positions according to priorities of the transmission channels corresponding to the at least two resource units in response to the transmission channels corresponding to the at least two resource units being different.

In an embodiment of the present disclosure, the determining module 101 is configured to determine a position of a resource unit corresponding to a transmission channel with a low priority as the set of positions for the frequency switching.

In an embodiment of the present disclosure, the determining module 101 is configured to take resources on two sides of the frequency switching point with a total number being a first number of resources as the set of positions in response to the transmission channels corresponding to the at least two resource units being same or having a same priority, in which the first number of resources is the number of resource units needed for the frequency switching.

In an embodiment of the present disclosure, the determining module 101 is configured to take resources on two sides of the frequency switching point with the total number being the first number of resources as the set of positions in response to the transmission channels corresponding to the at least two resource units being the same or having the same priority includes: taking the first number of resources on one side of the frequency switching point as the set of positions.

In an embodiment of the present disclosure, the determining module 101 is configured to discard a transmission content of a resource unit corresponding to a resource position in response to the resource position being occupied for the frequency switching; or, determine a resource unit corresponding to a resource position as an unavailable transmission resource in response to the resource position being occupied for the frequency switching; or, abandon a whole channel transmission corresponding to a resource position in response to the resource position being occupied for the frequency switching.

In an embodiment of the present disclosure, the determining module 101 is configured to ignore the resource position when performing rate matching in response to the resource position being occupied for the frequency switching.

In an embodiment of the present disclosure, the determining module 101 is configured to abandon the whole channel transmission corresponding to the resource position, and use subsequent resources for channel transmission in response to the resource position being occupied for the frequency switching.

Regarding the apparatus in the above-mentioned embodiments, the specific manners for performing operations for individual modules therein have been described in detail in the embodiments regarding the methods, which will not be elaborated herein.

Figure 9:
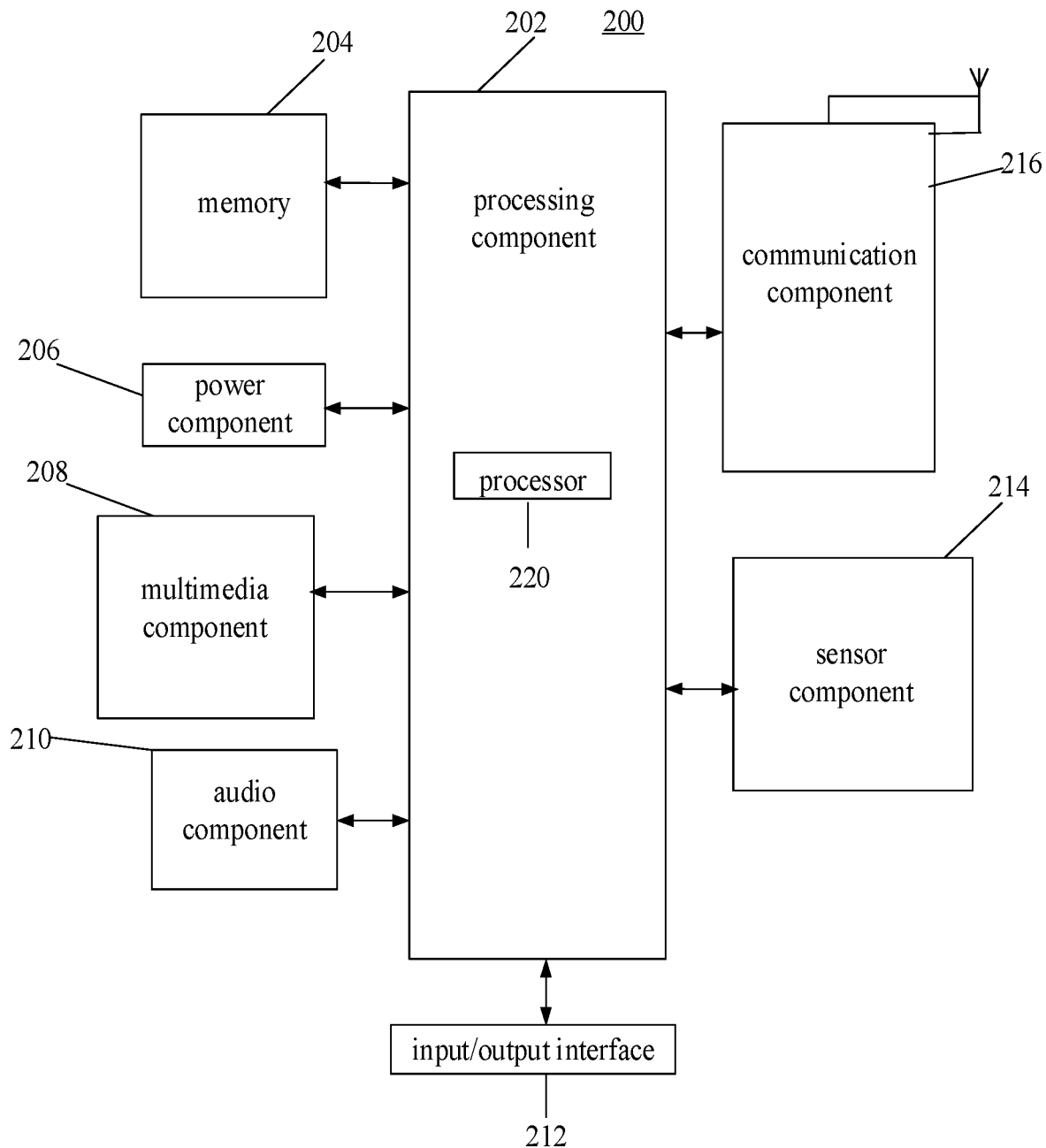
FIG. 9 is a block diagram showing an apparatus for frequency switching according to an illustrative embodiment.

FIG. 9 is a block diagram showing an apparatus 200 for frequency switching according to an illustrative embodiment. For example, the apparatus 200 can be a mobile phone, a computer, a digital broadcast terminal, a messaging device, a game console, a tablet device, a medical device, a fitness device, a personal digital assistant, or the like.

Referring to FIG. 9, the apparatus 200 may include one or more of the following components: a processing component 202, a memory 204, a power component 206, a multimedia component 208, an audio component 210, an input/output (I/O) interface 212, a sensor component 214, and a communication component 216.

The processing component 202 typically controls overall operations of the apparatus 200, such as the operations associated with display, phone calls, data communications, camera operations, and recording operations. The processing component 202 can include one or more processors 220 to execute instructions to perform all or some of the steps in the above-described methods. Moreover, the processing component 202 may include one or more modules which facilitate the interaction between the processing component 202 and other components. For instance, the processing component 202 may include a multimedia module to facilitate the interaction between the multimedia component 208 and the processing component 202.

The memory 204 is configured to store various types of data to support the operation of the apparatus 200. Examples of such data include instructions for any applications or methods operated on the apparatus 200, contact data, phonebook data, messages, pictures, videos, etc. The memory 204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the apparatus 200. The power component 206 may include a power management system, one or more power sources, and any other components associated with the generation, management, and distribution of power in the apparatus 200.

The multimedia component 208 includes a screen providing an output interface between the apparatus 200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 208 includes a front camera and/or a rear camera. The front camera and/or the rear camera may receive an external multimedia datum while the apparatus 200 is in an operation mode, such as a photographing mode or a video mode. Each of the front camera and the rear camera may be a fixed optical lens system or have focus and optical zoom capability.

The audio component 210 is configured to output and/or input audio signals. For example, the audio component 210 includes a microphone (MIC) configured to receive an external audio signal when the apparatus 200 is in an operation mode, such as a call mode, a recording mode, and a voice recognition mode. The received audio signal may be further stored in the memory 204 or transmitted via the communication component 216. In some embodiments, the audio component 210 further includes a speaker to output audio signals.

The I/O interface 212 provides an interface between the processing component 202 and peripheral interface modules, such as keyboards, click wheels, buttons, and the like. The buttons may include, but are not limited to, a home button, a volume button, a starting button, and a locking button.

The sensor component 214 includes one or more sensors to provide status assessments of various aspects of the apparatus 200. For instance, the sensor component 214 may detect an open/closed status of the apparatus 200, relative positioning of components, e.g., the display and the keypad, of the apparatus 200, a change in position of the apparatus 200 or a component of the apparatus 200, a presence or absence of user contact with the apparatus 200, an orientation or an acceleration/deceleration of the apparatus 200, and a change in temperature of the apparatus 200. The sensor component 214 may include a proximity sensor configured to detect the presence of nearby objects without any physical contact. The sensor component 214 may further include a light sensor, such as a CMOS or CCD image sensor, for use in imaging applications. In some embodiments, the sensor component 214 may further include an accelerometer sensor, a gyroscope sensor, a magnetic sensor, a pressure sensor, or a temperature sensor.

The communication component 216 is configured to facilitate communication, wired or wireless, between the apparatus 200 and other devices. The apparatus 200 can access a wireless network based on a communication standard. In an illustrative embodiment, the communication component 216 receives a broadcast signal or broadcast associated information from an external broadcast management system via a broadcast channel. In an illustrative embodiment, the communication component 216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the apparatus 200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above-mentioned method.

In an illustrative embodiment, there is also provided a non-transitory computer readable storage medium including instructions, such as included in the memory 204, executable by the processor 220 in the apparatus 200, for completing the above-mentioned method. For example, the non-transitory computer-readable storage medium may be a ROM, a random access memory (RAM), a CD-ROM, a magnetic tape, a floppy disc, an optical data storage device, and the like.

According to a first aspect of the embodiments of the present disclosure, there is provided a frequency switching method. The method includes determining a set of positions for frequency switching, according to configuration parameters related to frequency switching of a terminal and frequency switching points.

In an embodiment, the configuration parameters related to frequency switching of the terminal include N resource units occupied by the terminal for the frequency switching.

In an embodiment, the N resource units correspond to different values in different subcarrier intervals.

In an embodiment, determining the set of positions for the frequency switching includes determining M resource units before or after the frequency switching point as the set of positions for the frequency switching, where M is greater than or equal to N; or, determining X resource units before the frequency switching point and Y resource units after the frequency switching point as the set of positions for the frequency switching, where X and Y are both greater than or equal to 0, and a sum of X and Y is greater than or equal to N.

In an embodiment, the frequency switching point is located at a center of the N resource units occupied for the frequency switching; or, the frequency switching point is located at a boundary position of the N resource units occupied for the frequency switching.

In an embodiment, the configuration parameters related to frequency switching of the terminal include a number of orthogonal frequency division multiplexing (OFDM) symbols occupied for the frequency switching.

In an embodiment, the method includes determining resource positions of N resource units having an offset value of n with respect to the frequency switching point as the set of positions for the frequency switching, wherein N is a positive integer and N≥2, n is a positive integer and n≥0.

In an embodiment, the configuration parameters related to frequency switching of the terminal include transmission contents corresponding to at least two resource units on two sides of the frequency switching point.

In an embodiment, determining the set of positions for the frequency switching includes determining the set of positions according to transmission channels corresponding to the at least two resource units.

In an embodiment, determining the set of positions according to the transmission channels corresponding to the at least two resource units includes determining the set of positions according to priorities of the transmission channels corresponding to the at least two resource units in response to the transmission channels corresponding to the at least two resource units being different.

In an embodiment, determining the set of positions according to priorities of the transmission channels corresponding to the at least two resource units includes determining a position of a resource unit corresponding to a transmission channel with a low priority as the set of positions for the frequency switching.

In an embodiment, determining the set of positions according to the transmission channels corresponding to the at least two resource units includes taking resources on two sides of the frequency switching point with a total number being a first number of resources as the set of positions in response to the transmission channels corresponding to the at least two resource units being same or having a same priority, in which the first number of resources is the number of resource units needed for the frequency switching.

In an embodiment, determining the set of positions according to the transmission channels corresponding to the at least two resource units includes taking resources on two sides of the frequency switching point with the total number being the first number of resources as the set of positions in response to the transmission channels corresponding to the at least two resource units being the same or having the same priority includes: taking the first number of resources on one side of the frequency switching point as the set of positions.

In an embodiment, the method includes discarding a transmission content of a resource unit corresponding to a resource position in response to the resource position being occupied for the frequency switching; or, determining a resource unit corresponding to a resource position as an unavailable transmission resource in response to the resource position being occupied for the frequency switching; or, abandoning a whole channel transmission corresponding to a resource position in response to the resource position being occupied for the frequency switching.

In an embodiment, determining the resource unit corresponding to the resource position as the unavailable transmission resource in response to the resource position being occupied for the frequency switching includes ignoring the resource position when performing rate matching in response to the resource position being occupied for the frequency switching.

In an embodiment, abandoning the whole channel transmission corresponding to the resource position in response to the resource position being occupied for the frequency switching includes abandoning the whole channel transmission corresponding to the resource position, and using subsequent resources for channel transmission in response to the resource position being occupied for the frequency switching.

According to a second aspect of the embodiments of the present disclosure, there is provided a frequency switching apparatus. The apparatus includes a determining module configured to determine a set of positions for frequency switching, according to configuration parameters related to frequency switching of a terminal and frequency switching points.

In an embodiment, the configuration parameters related to frequency switching of the terminal include N resource units occupied by the terminal for the frequency switching.

In an embodiment, the N resource units correspond to different values in different subcarrier intervals.

In an embodiment, the determining module is configured to determine M resource units before or after the frequency switching point as the set of positions for the frequency switching, where M is greater than or equal to N; or, determine X resource units before the frequency switching point and Y resource units after the frequency switching point as the set of positions for the frequency switching, where X and Y are both greater than or equal to 0, and a sum of X and Y is greater than or equal to N.

In an embodiment, the frequency switching point is located at a center of the N resource units occupied for the frequency switching; or, the frequency switching point is located at a boundary position of the N resource units occupied for the frequency switching.

In an embodiment, the configuration parameters related to frequency switching of the terminal include a number of orthogonal frequency division multiplexing (OFDM) symbols occupied for the frequency switching.

In an embodiment, the apparatus includes determining resource positions of N resource units having an offset value of n with respect to the frequency switching point as the set of positions for the frequency switching, wherein N is a positive integer and N≥2, n is a positive integer and n≥0.

In an embodiment, the configuration parameters related to frequency switching of the terminal include transmission contents corresponding to at least two resource units on two sides of the frequency switching point.

In an embodiment, the determining module is configured to determine the set of positions according to transmission channels corresponding to the at least two resource units.

In an embodiment, the determining module is configured to determine the set of positions according to priorities of the transmission channels corresponding to the at least two resource units in response to the transmission channels corresponding to the at least two resource units being different.

In an embodiment, the determining module is configured to determine a position of a resource unit corresponding to a transmission channel with a low priority as the set of positions for the frequency switching.

In an embodiment, the determining module is configured to take resources on two sides of the frequency switching point with a total number being a first number of resources as the set of positions in response to the transmission channels corresponding to the at least two resource units being same or having a same priority, in which the first number of resources is the number of resource units needed for the frequency switching.

In an embodiment, the determining module is configured to take resources on two sides of the frequency switching point with the total number being the first number of resources as the set of positions in response to the transmission channels corresponding to the at least two resource units being the same or having the same priority includes: taking the first number of resources on one side of the frequency switching point as the set of positions.

In an embodiment, the determining module is configured to discard a transmission content of a resource unit corresponding to a resource position in response to the resource position being occupied for the frequency switching; or determine a resource position as an unavailable transmission resource in response to the resource position being occupied for the frequency switching; or abandon a whole channel transmission corresponding to a resource position in response to the resource position being occupied for the frequency switching.

In an embodiment, the determining module is configured to ignore the resource position when performing rate matching in response to the resource position being occupied for the frequency switching.

In an embodiment, the determining module is configured to abandon the whole channel transmission corresponding to the resource position, and use subsequent resources for channel transmission in response to the resource position being occupied for the frequency switching.

According to a third aspect of the embodiments of the present disclosure, there is provided a frequency switching apparatus, including a processor; and a memory for storing instructions executable by the processor; in which the processor is configured to implement the frequency switching method described in the first aspect, or any of the embodiments in the first aspect.

According to a fourth aspect of the embodiments of the present disclosure, there is provided a non-transitory computer-readable storage medium having stored therein instructions that, when executed by a processor of a mobile terminal, cause the mobile terminal to perform the frequency switching method described in the first aspect, or any of the embodiments in the first aspect.

The technical solutions provided by the embodiments of the present disclosure may have the following beneficial effects. A set of positions for frequency switching is determined, according to configuration parameters related to frequency switching of a terminal and frequency switching points, and by determining the blank time for frequency switching of the terminal, signal loss in the blank time is reduced.

It is further understood that "a plurality" in this disclosure refers to two or more, and other quantifiers are similar thereto. "And/or", which describes an associated relationship of associated objects, means that there may be three relationships, for example, A and/or B, which may mean that A exists alone, A and B exist at the same time, and B exists alone. A character "/" generally indicates that contextual objects are in an "or" relationship. "A/an" and "the" in singular forms are intended to include plural forms, unless clearly indicated in the context otherwise.

It is further understood that terms such as "first", and "second" are used to describe various information, these information should not be limited by these terms. These terms are only used for distinguishing information of the same type from each other and do not denote a particular order or degree of importance. As a matter of fact, the terms such as "first", and "second" may be used interchangeably. For example, first information may also be referred to as second information, and similarly, the second information may also be referred to as the first information, without departing from the scope of embodiments of the present disclosure.

It is further understood that although operations are described in a specific order in the accompanying drawings in the embodiments of the present disclosure, it should not be understood that these operations are required to be performed in the specific order shown or in a serial order, or that all of the operations shown are required to be performed to obtain desired results. In certain circumstances, multitasking and parallel processing may be advantageous.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A frequency switching method, comprising:
   determining a set of positions for frequency switching, according to configuration parameters related to frequency switching of a terminal and frequency switching points;
   wherein the configuration parameters related to frequency switching of the terminal comprise transmission contents corresponding to at least two resource units on two sides of the frequency switching point.

2. The method of claim 1, wherein the configuration parameters related to frequency switching of the terminal comprise N resource units occupied by the terminal for the frequency switching.

3. The method of claim 2, wherein the N resource units correspond to different values in different subcarrier intervals.

4. The method of claim 2, wherein determining the set of positions for the frequency switching comprises:
   determining M resource units before or after the frequency switching point as the set of positions for the frequency switching, where M is greater than or equal to N;
   or,
   determining X resource units before the frequency switching point and Y resource units after the frequency switching point as the set of positions for the frequency switching, where X and Y are both greater than or equal to 0, and a sum of X and Y is greater than or equal to N.

5. The method of claim 2, wherein
   the frequency switching point is located at a center of the N resource units occupied for the frequency switching;
   or,
   the frequency switching point is located at a boundary position of the N resource units occupied for the frequency switching.

6. The method of claim 1, wherein the configuration parameters related to frequency switching of the terminal comprise a number of orthogonal frequency division multiplexing (OFDM) symbols occupied for the frequency switching.

7. The method of claim 2, comprising:
   determining resource positions of N resource units having an offset value of n with respect to the frequency switching point as the set of positions for the frequency switching, wherein N is a positive integer and N≥2, n is a positive integer and n≥0.

8. The method of claim 1, wherein determining the set of positions for the frequency switching comprises:
   determining the set of positions according to transmission channels corresponding to the at least two resource units.

9. The method of claim 8, wherein determining the set of positions according to the transmission channels corresponding to the at least two resource units comprises:
   determining the set of positions according to priorities of the transmission channels corresponding to the at least two resource units in response to the transmission channels corresponding to the at least two resource units being different.

10. The method of claim 9, wherein determining the set of positions according to priorities of the transmission channels corresponding to the at least two resource units comprises:
    determining a position of a resource unit corresponding to a transmission channel with a low priority as the set of positions for the frequency switching.

11. The method of claim 8, wherein determining the set of positions according to the transmission channels corresponding to the at least two resource units comprises:
    taking resources on two sides of the frequency switching point with a total number being a first number of resources as the set of positions in response to the transmission channels corresponding to the at least two resource units being same or having a same priority, wherein the first number of resources is the number of resource units needed for the frequency switching.

12. The method of claim 11, wherein determining the set of positions according to the transmission channels corresponding to the at least two resource units comprises:
    taking resources on two sides of the frequency switching point with the total number being the first number of resources as the set of positions in response to the transmission channels corresponding to the at least two resource units being the same or having the same priority comprises: taking the first number of resources on one side of the frequency switching point as the set of positions.

13. The method of claim 1, comprising:
    discarding a transmission content of a resource unit corresponding to a resource position in response to the resource position being occupied for the frequency switching;
    or,
    determining a resource unit corresponding to a resource position as an unavailable transmission resource in response to the resource position being occupied for the frequency switching;
    or,
    abandoning a whole channel transmission corresponding to a resource position in response to the resource position being occupied for the frequency switching.

14. The method of claim 13, wherein determining the resource unit corresponding to the resource position as the unavailable transmission resource in response to the resource position being occupied for the frequency switching comprises:

ignoring the resource position when performing rate matching in response to the resource position being occupied for the frequency switching.

15. The method of claim 13, wherein abandoning the whole channel transmission corresponding to the resource position in response to the resource position being occupied for the frequency switching comprises:

abandoning the whole channel transmission corresponding to the resource position, and using subsequent resources for channel transmission in response to the resource position being occupied for the frequency switching.

16. A frequency switching apparatus, comprising:

a processor; and a memory for storing instructions executable by the processor;

wherein the processor is configured to determine a set of positions for frequency switching, according to configuration parameters related to frequency switching of a terminal and frequency switching points;

wherein the configuration parameters related to frequency switching of the terminal comprise transmission contents corresponding to at least two resource units on two sides of the frequency switching point.

17. A non-transitory computer-readable storage medium having stored therein instructions that, when executed by a processor of a mobile terminal, cause the mobile terminal to:

determine a set of positions for frequency switching, according to configuration parameters related to frequency switching of a terminal and frequency switching points;

wherein the configuration parameters related to frequency switching of the terminal comprise transmission contents corresponding to at least two resource units on two sides of the frequency switching point.

18. The frequency switching apparatus of claim 16, wherein the configuration parameters related to frequency switching of the terminal comprise N resource units occupied by the terminal for the frequency switching.

19. The frequency switching apparatus of claim 18, wherein the N resource units correspond to different values in different subcarrier intervals.

20. The frequency switching apparatus of claim 18, wherein the processor is configured to:

determine M resource units before or after the frequency switching point as the set of positions for the frequency switching, where M is greater than or equal to N;

or, determine X resource units before the frequency switching point and Y resource units after the frequency switching point as the set of positions for the frequency switching, where X and Y are both greater than or equal to 0, and a sum of X and Y is greater than or equal to N.

* * * * *